United States Patent
Long et al.

(10) Patent No.: US 10,859,401 B2
(45) Date of Patent: Dec. 8, 2020

(54) FAULT TOLERANT SERVO SENSOR WITH LINEAR HALL SENSORS AND DISCRETE HALL SENSORS

(71) Applicant: Wisk Aero LLC, Mountain View, CA (US)

(72) Inventors: Geoffrey Alan Long, Montara, CA (US); Brian Robert Viele, Crozet, VA (US)

(73) Assignee: WISK AERO LLC, Mountain View, CA (US)

( * ) Notice: Subject to any disclaimer, the term of this patent is extended or adjusted under 35 U.S.C. 154(b) by 0 days.

(21) Appl. No.: 16/004,224

(22) Filed: Jun. 8, 2018

(65) Prior Publication Data
US 2018/0292234 A1    Oct. 11, 2018

Related U.S. Application Data

(62) Division of application No. 15/421,038, filed on Jan. 31, 2017, now Pat. No. 10,036,654.

(51) Int. Cl.
*G01D 5/14*  (2006.01)
*G01D 3/02*  (2006.01)

(52) U.S. Cl.
CPC ............ *G01D 5/145* (2013.01); *G01D 3/02* (2013.01)

(58) Field of Classification Search
None
See application file for complete search history.

(56) References Cited

U.S. PATENT DOCUMENTS

| | | | |
|---|---|---|---|
| 5,241,267 A * | 8/1993 | Gleixner | G01P 3/487 324/174 |
| 7,021,587 B1 | 4/2006 | Younkin | |
| 7,477,052 B2 | 1/2009 | Schmidt | |
| 8,957,678 B2 | 2/2015 | Oota | |
| 10,036,654 B1 | 7/2018 | Long et al. | |
| 2005/0217923 A1* | 10/2005 | Onizuka | B62D 5/0409 180/444 |
| 2011/0057661 A1 | 3/2011 | Samineni | |
| 2014/0028228 A1 | 1/2014 | Huang | |

(Continued)

FOREIGN PATENT DOCUMENTS

| | | |
|---|---|---|
| DE | 102004061405 | 7/2006 |
| EP | 2093538 | 8/2009 |

(Continued)

OTHER PUBLICATIONS

Wikipedia: RotaryEncoder https://web.archive.org/web/20161228184818/https://en.wikipedia.org/wiki/Rotary_encoder retrieved by Archive.org on Dec. 28, 2016 (Year: 2016).*

(Continued)

*Primary Examiner* — Alexander Satanovsky
*Assistant Examiner* — Mark I Crohn
(74) *Attorney, Agent, or Firm* — Kilpatrick Townsend & Stockton LLP

(57) ABSTRACT

At least an output shaft angle associated with an output shaft is initialized to a known value where the output shaft is coupled to a motor shaft via a set of one or more gears. A direction of rotation associated with the motor shaft is determined using a plurality of discrete Hall sensors in the motor and the output shaft angle is updated using an incremental value and the direction of rotation.

22 Claims, 16 Drawing Sheets

Top View

(56) References Cited

U.S. PATENT DOCUMENTS

| | | | |
|---|---|---|---|
| 2014/0347040 A1 | 11/2014 | Kawase | |
| 2015/0022186 A1 | 1/2015 | Ausserlechner | |
| 2016/0124418 A1* | 5/2016 | Lagarde | E06B 9/72 318/630 |
| 2017/0093313 A1 | 3/2017 | Brown | |
| 2017/0117117 A1* | 4/2017 | Ishikawa | H01J 37/20 |

FOREIGN PATENT DOCUMENTS

| | | |
|---|---|---|
| FR | 2902872 | 12/2007 |
| WO | 03087845 | 10/2003 |
| WO | 2014037273 | 3/2014 |
| WO | 2018143973 A1 | 9/2018 |

OTHER PUBLICATIONS

Author Unknown, "maxon EC motor: ironless winding Technology—short and to the point", Nov. 2014.

Tima et al, "Guidelines for Using Allegro Angular Sensors", Allegro MicroSystems, LLC, Jun. 24, 2014.

Wikipedia: Alpha Beta Transformation <https://web.archive.org/web/20161209110323/https://en.wikipedia.org/wiki/Alpha-beta_transformation>retrieved by archive.org on Dec. 9, 2016).

Wikipedia: Parallel (Geometry) https://web.archive.org/web/20161019052740/https://en.wikipedia.org/wiki/Parallel_(geometry) retrieved by archive.org on Oct. 19, 2016.

International Search Report and Written Opinion—PCT/US2017/015966—ISA/EPO—dated Apr. 17, 2017.

U.S. Appl. No. 15/421,038, "Final Office Action" dated Jan. 22, 2018, 14 pages.

U.S. Appl. No. 15/421,038, "Non-Final Office Action" dated Sep. 1, 2017, 21 pages.

U.S. Appl. No. 15/421,038, "Notice of Allowance" dated Apr. 13, 2018, 15 pages.

International Application No. PCT/US2017/015966, "International Preliminary Report on Patentability" dated Aug. 15, 2019, 12 pages.

EP17895244.6 , "Extended European Search Report", dated Oct. 1, 2020, 9 pages.

* cited by examiner

Top View

Top View

| 1st Discrete Hall Sensor | 2nd Discrete Hall Sensor | 3rd Discrete Hall Sensor | Rotor Position (in Motor Shaft) |
|---|---|---|---|
| 1 | 0 | 1 | Sector 1 (0° – 60°) |
| 1 | 0 | 0 | Sector 2 (60° – 120°) |
| 1 | 1 | 0 | Sector 3 (120° – 180°) |
| 0 | 1 | 0 | Sector 4 (180° – 240°) |
| 0 | 1 | 1 | Sector 5 (240° – 300°) |
| 0 | 0 | 1 | Sector 6 (300° – 360°) |

180:1 Gear Ratio

| Rotor Position | Output Shaft Angle |
|---|---|
| Sector 1 (0° – 60°) | 0° ← Initialize |
| Sector 2 (60° – 120°) | ⅓° |
| Sector 3 (120° – 180°) | ⅔° |
| Sector 4 (180° – 240°) | 1° |
| Sector 5 (240° – 300°) | 1⅓° |
| Sector 6 (300° – 360°) | 1⅔° |
| Sector 1 (0° – 60°) | 2° |
| Sector 2 (60° – 120°) | 2⅓° |
| Sector 3 (120° – 180°) | 2⅔° |
| Sector 4 (180° – 240°) | 3° |
| Sector 5 (240° – 300°) | 3⅓° |
| Sector 6 (300° – 360°) | 3⅔° |
| Sector 1 (0° – 60°) | 4° |
| Sector 2 (60° – 120°) | 4⅓° |
| Sector 3 (120° – 180°) | 4⅔° |
| Sector 4 (180° – 240°) | 5° |
| Sector 5 (240° – 300°) | 5⅓° |
| Sector 6 (300° – 360°) | 5⅔° |
| ⋮ | ⋮ |
| Sector 4 (180° – 240°) | 359° |
| Sector 5 (240° – 300°) | 359⅓° |
| Sector 6 (300° – 360°) | 359⅔° |

1200 → row 1; 1202 → row 2; 1204 → row 8; 1206 → row 14

FIG. 12

FAULT TOLERANT SERVO SENSOR WITH LINEAR HALL SENSORS AND DISCRETE HALL SENSORS

CROSS REFERENCE TO OTHER APPLICATIONS

This application is a divisional of co-pending U.S. patent application Ser. No. 15/421,038 entitled FAULT TOLERANT SERVO SENSOR WITH LINEAR HALL SENSORS AND DISCRETE HALL SENSORS filed Jan. 31, 2017 which is incorporated herein by reference for all purposes.

BACKGROUND OF THE INVENTION

One type of sensor for measuring the angle of an output shaft (e.g., in an aircraft or an automobile) uses four linear Hall sensors packaged in a single integrated circuit (IC) and a diametrically magnetized disk (i.e., a magnet) oriented above the IC which contains the Hall sensors. The magnet is typically mounted to the output shaft of the servo and the IC is typically mounted on a printed circuit board (PCB) normal to the output shaft axis. To provide redundancy, some IC manufacturers produce ICs with two sets of four Hall sensors (e.g., for a total of eight sensors). However, since both sets of sensors are packaged in the same IC, such sensors are vulnerable to common mode failures (e.g., both sets of Hall sensors are unavailable if the IC loses power). New techniques for measuring the angle of a shaft (e.g., with less vulnerability to common mode failures) would be desirable.

BRIEF DESCRIPTION OF THE DRAWINGS

Various embodiments of the invention are disclosed in the following detailed description and the accompanying drawings.

FIG. 12 is a diagram illustrating an embodiment of related positions of a rotor in a motor shaft and angles of an output shaft.

DETAILED DESCRIPTION

Figure 1A:
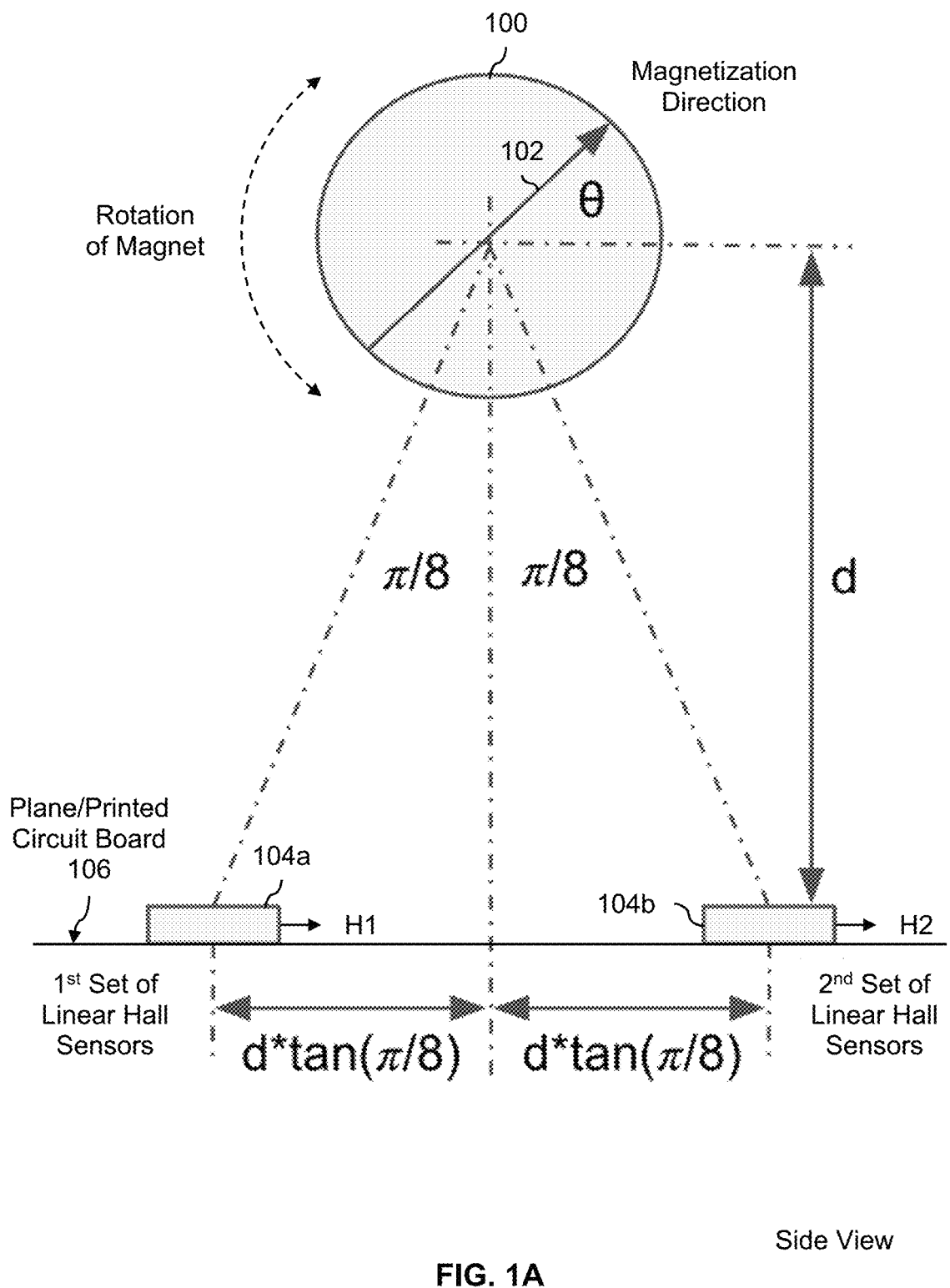
FIG. 1A is a diagram illustrating an embodiment of a servo sensor with two sets of linear Hall sensors from a side view.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Two techniques for implementing a fault tolerant servo sensor (where servo sensors measure the angle of an output shaft in a servo system) are described herein. In one technique, multiple sets of linear Hall sensors located on different components (e.g., different integrated circuits) are used to measure or otherwise estimate the angle. In some such embodiments (e.g., when three or more sets of linear Hall sensors are used), the health of the system is monitored (e.g., to detect if one of the linear Hall sensors goes bad). If the health status signal indicates that the angle estimate cannot be trusted, in some embodiments the servo sensor switches to a different technique to estimate the angle, such as the second technique described herein which uses discrete Hall sensors which included in the motor (e.g., the shaft) to measure the angle of the output shaft. In some embodiments, both techniques are used together (e.g., the angle of the output shaft is measured using linear Hall sensors as the primary or initial technique and discrete Hall sensors are used as the secondary or backup technique). In some embodiments, only one technique is used in a system (e.g., linear Hall sensors without discrete Hall sensors, or vice versa). Various embodiments of both techniques are described below.

Examples with Linear Hall Sensors

FIG. 1A is a diagram illustrating an embodiment of a servo sensor with two sets of linear Hall sensors from a side view. In the example shown, a magnet (100) has a magnetization direction shown by arrow 102. The magnet is attached to an output shaft and as the output shaft rotates, the magnet also rotates, moving the magnetization direction about an axis of rotation that goes through the center of magnet 100 and normal to the plane of the drawing. The angle of the magnet (and thus, the angle of the output shaft which is coupled to the magnet) is denoted as θ in the figure.

To measure the angle of the magnet (and, correspondingly, the angle of the output shaft), two sets of linear Hall sensors are used in this example: a first set of linear Hall sensors on a first IC (or, more generally, component) (104a) and a second set of linear Hall sensors on a second IC (104b). Linear Hall sensors generate a voltage output that is linear with the magnetic field orthogonal to the IC plane (e.g., as opposed to discrete Hall sensors which output a 0 or a 1). In some embodiments, each IC or set of linear Hall sensors has four sensors. One way of describing the positional relationship between the ICs and the magnet is that the ICs are in a plane (106) (e.g., coming out of the page) which is parallel to the magnet's axis of rotation (e.g., coming out of the page at the center of magnet 100). The plane (106) is also where a printed circuit board (e.g., to which the ICs are mounted) would be.

In the arrangement shown, the two ICs measure the vertical component of the magnetic field (i.e., in the vertical direction of the drawing). The values measured by the first set of linear Hall sensors and the second set of linear Hall sensors are referred to as H1 and H2, respectively. As the magnet rotates, the field measured by the two sets of sensors are approximately proportional to $\sin(\theta+\varphi)$ and $\cos(\theta+\varphi)$ respectively, where $\varphi$ is an angular offset that depends on how the magnet is mounted to the shaft. The value $\varphi$ can be calibrated out, or the magnet can be assembled precisely to make it a negligible value, so it is subsequently assumed to be zero. Also, the constant of proportionality (e.g., which the above $\sin(\theta+\varphi)$ and $\cos(\theta+\varphi)$ are multiplied against) for the two sets of sensors is the same. In this example, the estimated angle (i.e., θestimate) is derived from the measured sensor values as follows:

$$\theta\text{estimate} = a\tan 2(H1, H2)$$

By using the a tan 2 function, the above equation outputs angles with a range of $(-\pi, \pi]$ (which can be converted to $(0, 2\pi]$ by adding $2\pi$ to negative values). In other words, the θestimate generated by the above equation is able to span a full rotation of the magnet (i.e., 0 to $2\pi$). If there are any small residual errors between the actual angle θ and the estimated angle θestimate, they can be compensated for by using a one dimensional lookup table.

The following figure shows the same system from a top view.

Figure 1B:
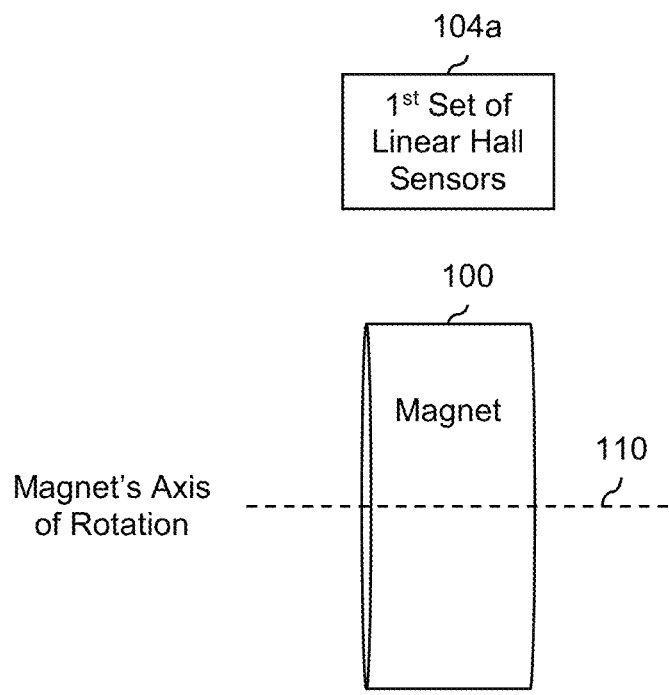
FIG. 1B is a diagram illustrating an embodiment of a servo sensor with two sets of linear Hall sensors from a top view.

FIG. 1B is a diagram illustrating an embodiment of a servo sensor with two sets of linear Hall sensors from a top view. In this view, the viewer is looking down on the magnet and the linear Hall sensors, with the magnet closer to the viewer. As shown in this view, neither set of linear Hall sensors (102a and 102b) lie in the magnet's axis of rotation (110).

FIG. 1A and FIG. 1B shows that the two sets of linear Hall sensors are in separate ICs and therefore the exemplary servo sensor is not vulnerable to common mode failures. For example, if the first IC with the first set of linear Hall sensors lost power, the second IC does not automatically or necessarily lose power as well. This offers an improvement over measurement technique where all of the linear Hall sensors are in the same component.

With other types of servo sensors, it is not easy or straightforward to simply divide up the various linear Hall sensors into multiple ICs. This is because other techniques rely upon the linear Hall sensors being in the magnet's axis of rotation (unlike the arrangement shown in FIG. 1A and FIG. 1B). The following figure shows an example of this.

Figure 2:
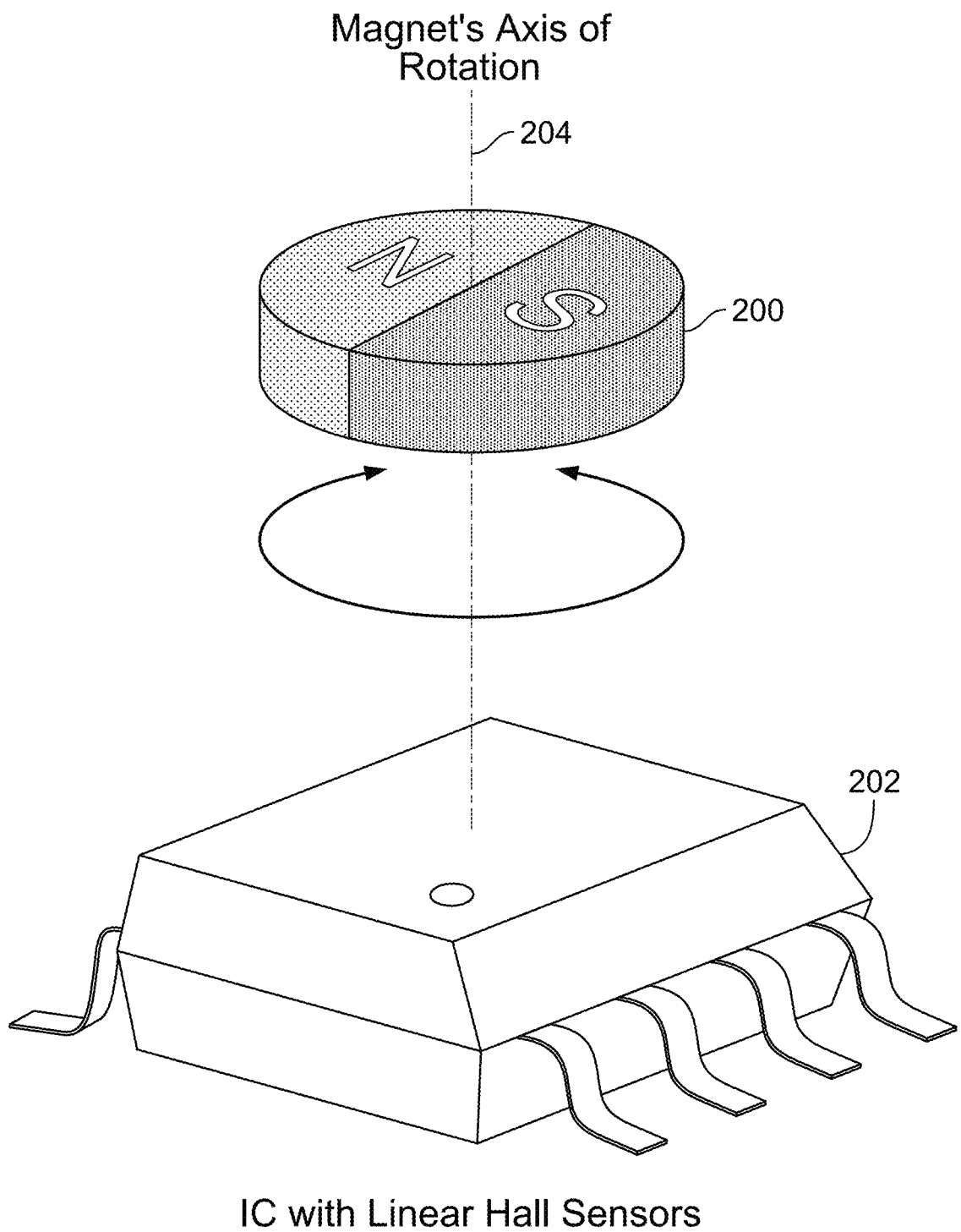
FIG. 2 is a diagram illustrating another type of servo sensor which is more vulnerable to common mode failure.

FIG. 2 is a diagram illustrating another type of servo sensor which is more vulnerable to common mode failure. As before, a magnet (200) is connected to an output shaft (not shown). An IC (202), which includes one or more linear Hall sensors, is used to measure the angle of the magnet. In order to do so, all of the linear Hall sensors are expected to lie in the magnet's axis of rotation (204) and have the same distance from the magnet. Above the magnet (not shown) is the output shaft to which the magnet is coupled. Therefore, a second, hypothetical IC (not shown) with linear Hall sensors cannot be placed above the magnet. The second IC also cannot be placed below the magnet at the same distance as the IC shown, because then two ICs would occupy the same point in space, which is not possible. It is therefore not easy to separate linear Hall sensors into multiple packages or components with other angle measurement techniques.

The design shown in FIG. 2 also places more constraints on the placement or layout of components, which may make the overall design larger. In contrast, arrangement shown in FIG. 1A and FIG. 1B makes the layout or design of the system easier and/or the layout or design can be better optimized so that the overall volume or size of the servo sensor is smaller.

The following figure describes the technique(s) described above more formally and/or generally in a flowchart.

Figure 3:
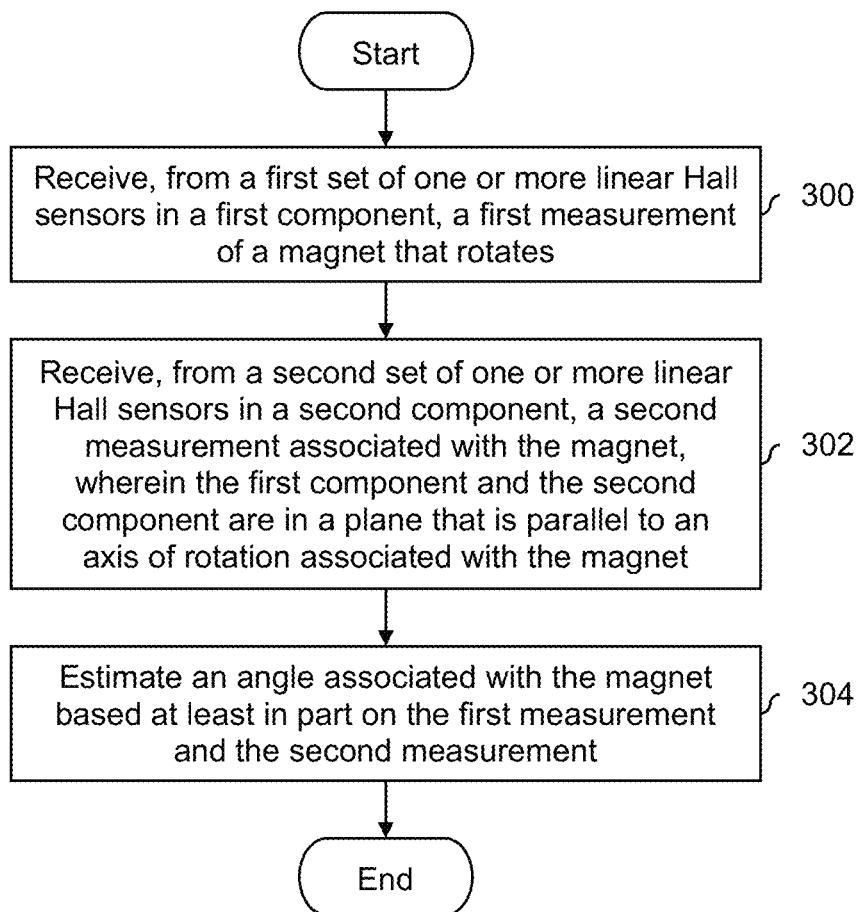
FIG. 3 is a flowchart illustrating an embodiment of a process to estimate an angle using two or more sets of linear Hall sensors.

FIG. 3 is a flowchart illustrating an embodiment of a process to estimate an angle using two or more sets of linear Hall sensors. In one example application, the method is performed by an aircraft (e.g., a fly-by-wire aircraft) which uses servos to move aerodynamic control surfaces of the airplane. This method may be used to measure the angle of such servos so that the measured angle can be compared against some desired angle (e.g., in a feedback loop in the servo system). In some embodiments, the process is performed using the system shown in FIG. 1A and FIG. 1B.

At 300, a first measurement of a magnet that rotates is received from a first set of one or more linear Hall sensors in a first component. The measurement H1 from FIG. 1A is one example of a first measurement that may be received at step 300 and the first IC which holds the first set of linear Hall sensors (104a) is one example of a first set of one or more linear Hall sensors and/or a first component from which such a measurement is received.

At 302, a second measurement associated with the magnet is received from a second set of one or more linear Hall sensors in a second component, wherein the first component and the second component are in a plane that is parallel to an axis of rotation associated with the magnet. In FIG. 1A, for example, H2 is received from the second IC which includes the second set of linear Hall sensors (104b). FIG. 1A also shows that the two ICs (or, more generally, components) are in plane 106 which is parallel to the magnet's axis of rotation.

At 304, an angle associated with the magnet is estimated based at least in part on the first measurement and the second measurement. For example, in the above equation, the H1 and H2 values are input to an a tan 2 function and the output of the a tan 2 function is the estimated or measured angle.

In some embodiments, measurements from three or more components (where each component has its own set of linear Hall sensors) is used to determine the angle associated with the magnet. The following figure shows one such example.

Figure 4:
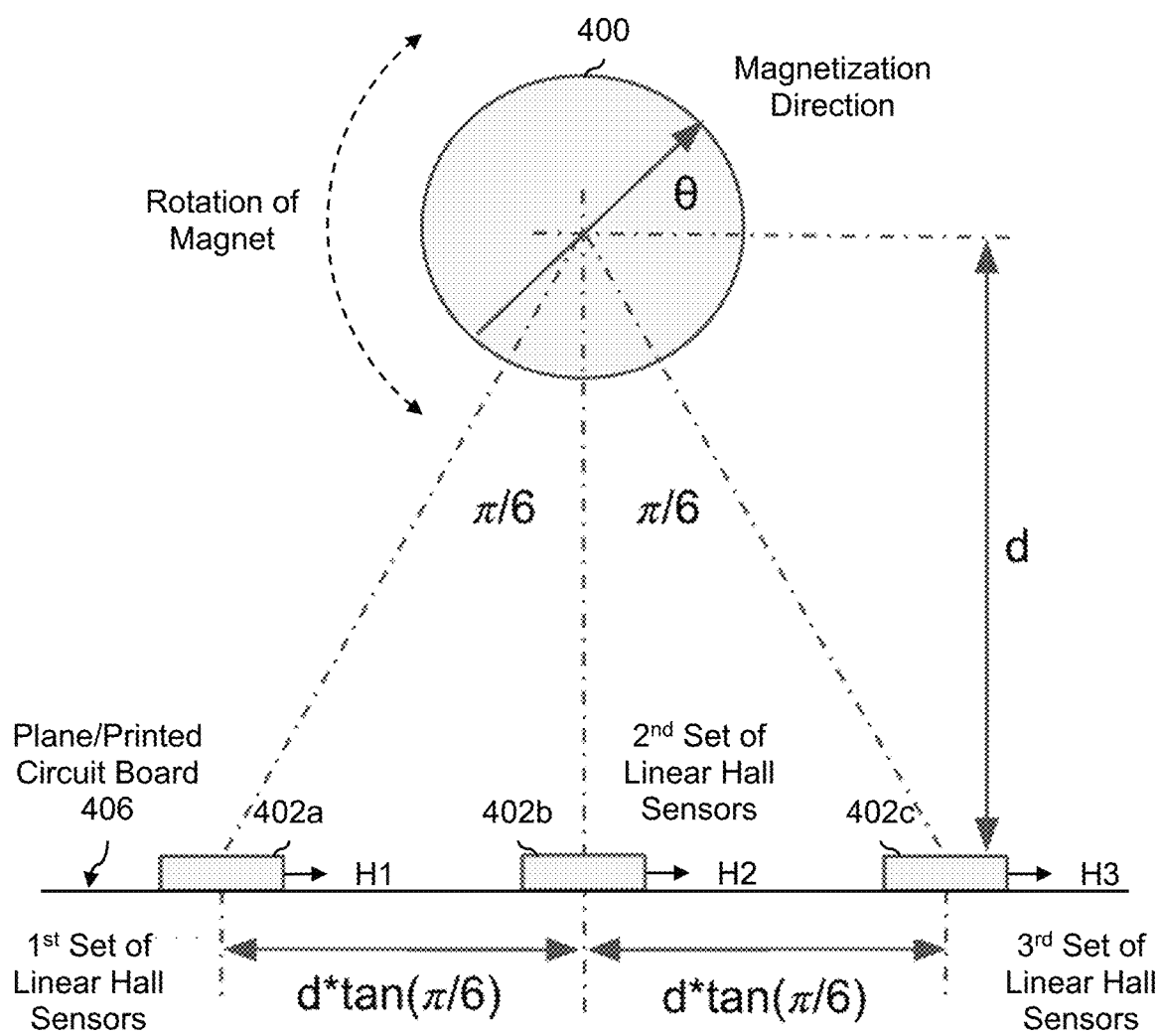
FIG. 4 is a diagram illustrating an embodiment of a servo sensor with three sets of linear Hall sensors.

FIG. 4 is a diagram illustrating an embodiment of a servo sensor with three sets of linear Hall sensors. In this example, a first set of linear Hall sensors is in a first IC (402a), a second set of linear Hall sensors is in a second IC (402b), and a third set of linear Hall sensors is in a third IC (402c). The three ICs output measured values of H1, H2, and H3, respectively. It is noted that the angle formed by the first IC (402a), the magnet (400), and the third IC (402c) in this figure is π/3 whereas in FIG. 1A this angle is π/4. As before, the ICs (402a-402c) are in a plane (406) which is parallel to the magnet's axis of rotation (e.g., coming out of the page at the center of magnet 400).

For context, the following figure shows one example of a PCB with three ICs (containing three sets of linear Hall sensors) mounted to the PCB.

Figure 5:
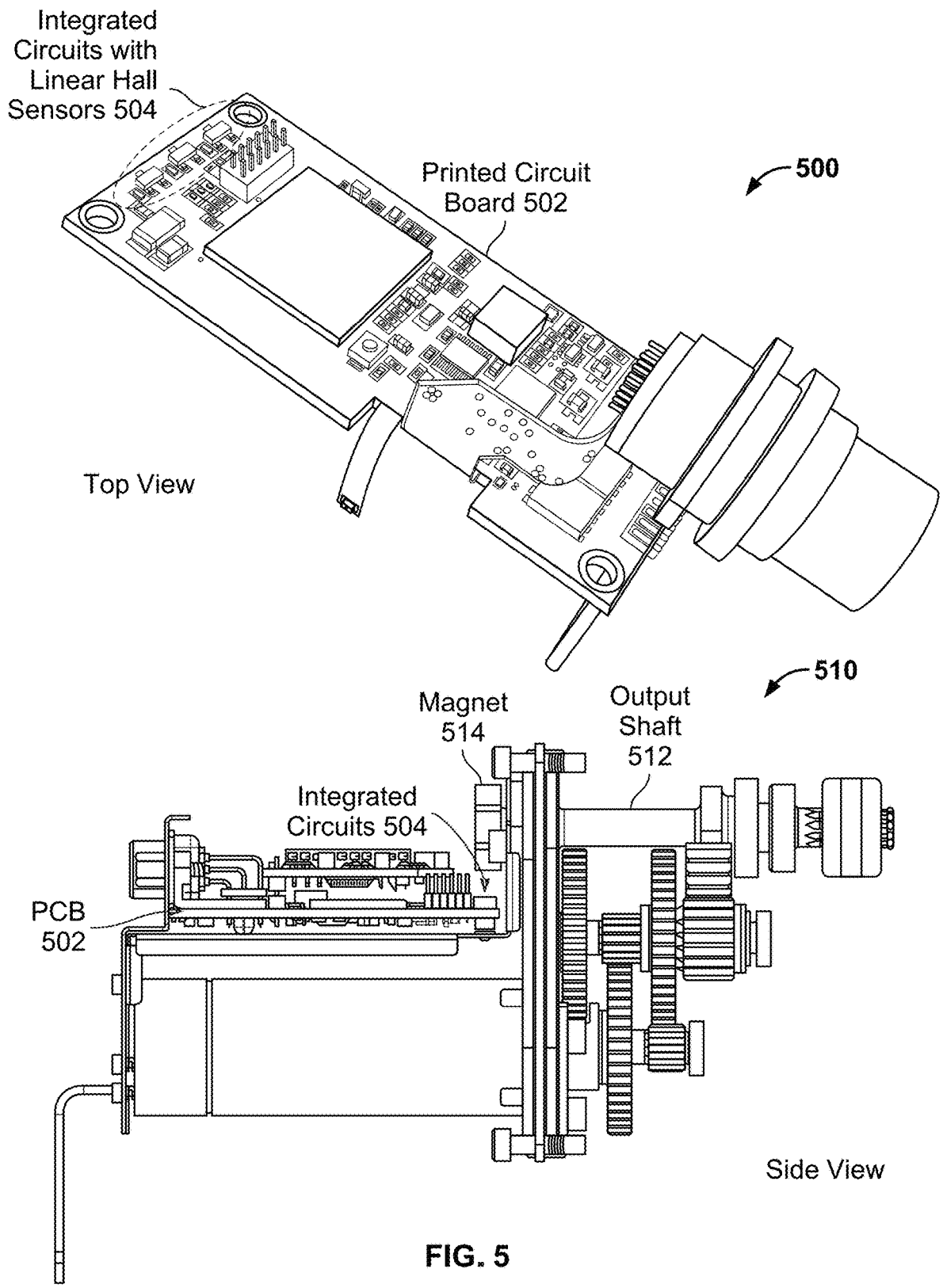
FIG. 5 is a diagram illustrating an embodiment of a PCB with three ICs with linear Hall sensors.

FIG. 5 is a diagram illustrating an embodiment of a PCB with three ICs with linear Hall sensors. In the example shown, diagram 500 shows a top view of a PCB (502) with the three ICs with linear Hall sensors (504) mounted to the PCB. In this diagram, the magnet and output shaft for which an angle is measured is not shown.

Diagram 510 shows a side view of the same PCB (502) with additional components which are not shown in diagram 500. The output shaft (512) rotates per the instructions of the servo and the rotation of the output shaft causes a magnet (514) attached to the output shaft to similarly rotate. Directly beneath the magnet are the three ICs with the linear Hall sensors (504) which are attached to PCB 502. It is noted that in diagram 510 the ICs are not visible because they are blocked by a screw or bolt.

In some embodiments, the arrangement of linear Hall sensors described herein permits less expensive packaging. For example, as diagram 510 shown, the output shaft (512) is parallel to PCB 502 and this may permit the overall size of the servo system to be smaller, which makes the system to be less expensive.

Returning to FIG. 4, it is noted that the second IC (402b) is located closer to the magnet (400) compared to the first IC (402a) and the third IC (402c). This causes the H2 signal to have a larger amplitude compared to the H1 signal and H3 signal. The following figure shows an example of the H1, H2, and H3 signals as a function of the magnet's angle.

Figure 6:
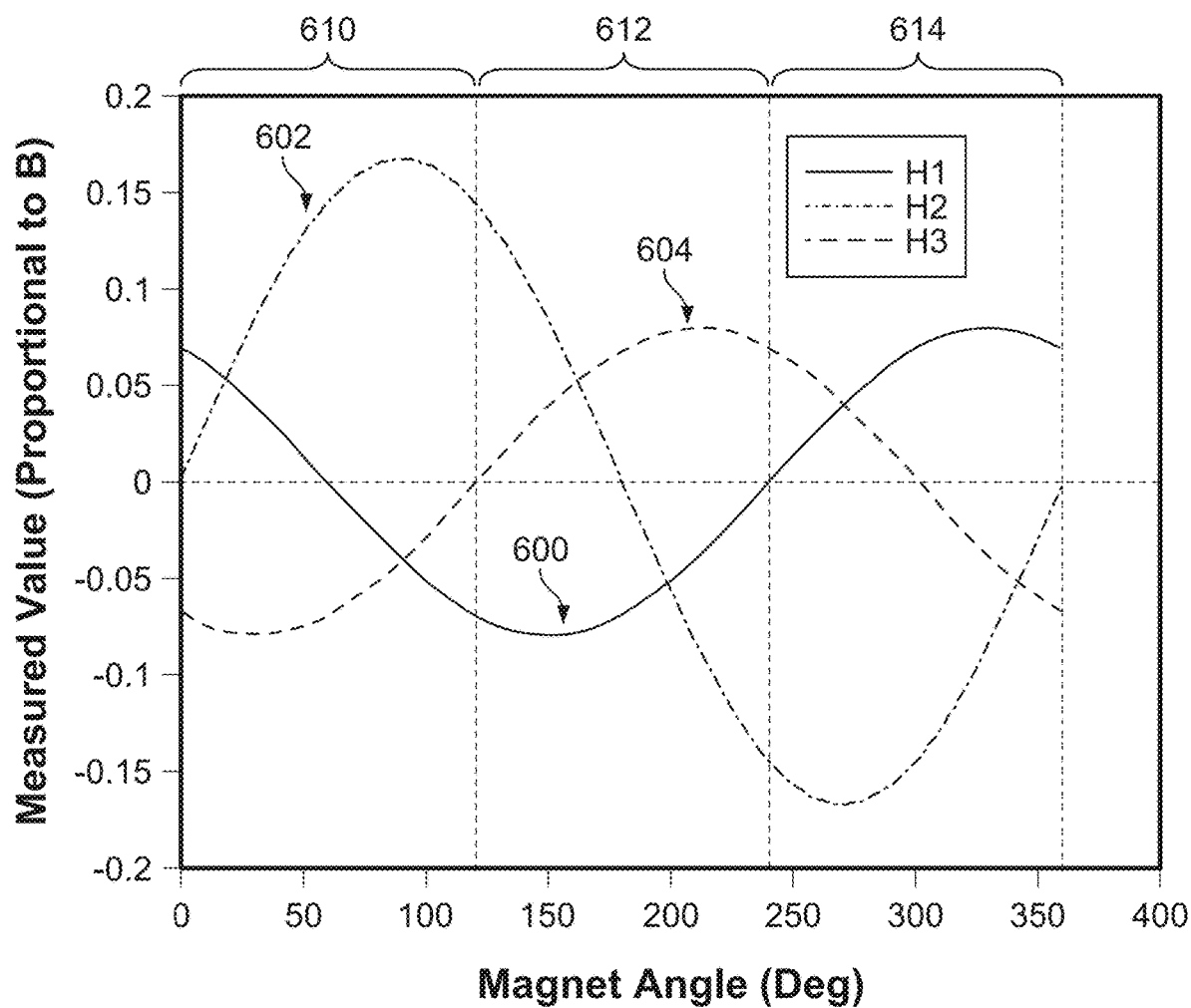
FIG. 6 is a graph illustrating an embodiment of values measured by three sets of linear Hall sensors as a function of angle.

FIG. 6 is a graph illustrating an embodiment of values measured by three sets of linear Hall sensors as a function of angle. In the example shown, the x-axis of the graph is the angle of the magnet in degrees (e.g., θ in FIG. 4) and the y-axis is the measured value (proportional to the magnetic field, B) output by a particular IC or set of linear Hall sensors (e.g., 402a-402c in FIG. 4). Signal 600 shows the H1 measured values output by a first IC (e.g., 402a in FIG. 4), signal 602 shows the H2 measured values output by a second IC (e.g., 402b in FIG. 4), and signal 604 shows the H3 measured values output by a third IC (e.g., 402c in FIG. 4). As shown here, the signals have a phase difference of ~120°.

In contrast, with the two IC arrangement shown in FIG. 1A and FIG. 1B, the H1 and H2 signals there would be 90° out of phase.

In the two sensor configuration shown in FIG. 1A and FIG. 1B, a failure of either IC would cause the measured angle to be very wrong. Unfortunately, it may be difficult to detect when the estimate is wrong when there are only two sets of linear Hall sensors. The addition of a third set of linear Hall sensors (as shown here) makes it possible to know when one of the ICs containing one set of linear Hall sensors or some other component has failed. The following figure shows an example of system which uses three sets of linear Hall sensors to measure an angle and monitor the health of the system.

Figure 7:
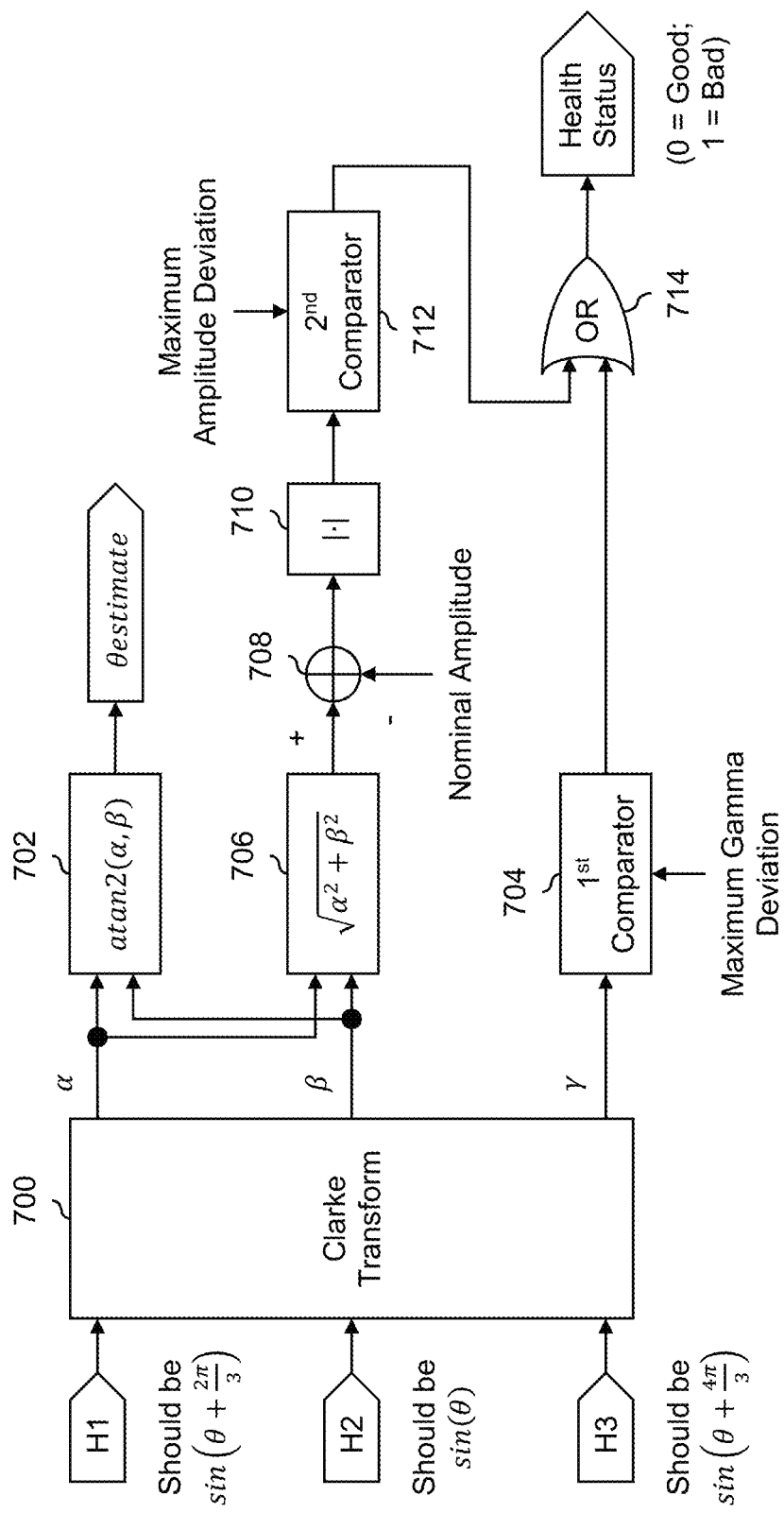
FIG. 7 is a block diagram of a system which uses three sets of linear Hall sensors to measure an angle and monitoring the health of the system.

FIG. 7 is a block diagram of a system which uses three sets of linear Hall sensors to measure an angle and monitoring the health of the system. In the example shown, a Clarke transform (700) inputs the three measured values of H1, H2, and H3 after scaling to account for the different amplitudes. As shown in FIG. 5, the H1-H3 signals input by the Clarke transform (ignoring any amplitude differences for now) should be $$\sin\left(\theta + \frac{2\pi}{3}\right),$$

$\sin(\theta)$, and $$\sin\left(\theta + \frac{4\pi}{3}\right),$$

respectively, if all of the linear Hall sensors are working properly. The differences in amplitude shown in FIG. 6 may be handled before the H1-H3 signals are input to the Clarke transformation, for example by using a different part number for the middle IC (e.g., 402b in FIG. 4) compared to the outer ICs (e.g., 402a and 402c in FIG. 4) so that the amplitudes of the outputs of the ICs mostly or substantially match (using different part numbers also helps with the signal to noise ratio). Any residual scale factor imbalance can be accounted for in software with calibration factors after the signals have been digitized with an analog-to-digital converter (ADC).

The Clarke transform (also known as an alpha-beta transform) is a matrix operation that inputs the H1-H3 values and outputs three values: an alpha (α) value, a beta (β) value, and a gamma (γ) value. The alpha and beta values output by the transformation are orthogonal and are similar to the sin(θ+φ) and cos(θ+φ) values that were used in the two sensor equation above. So, similar to above, the estimated angle is calculated by:

θestimate=atan 2(α,β)

This is reflected by the a tan 2 function (702) which inputs the alpha and beta values from the Clarke transform (700). The θestimate is output and may be used by the system as desired (e.g., in a feedback loop where the estimated or measured angle is compared against some desired angle). In some embodiments, calibration and/or correction is periodically performed in support of a trigonometric solution to the correction of scale factors (above). For example, such corrections may be used to account for the variability in placement of the sensors, thermal effects on the magnet and/or sensors, local magnetic fields/offsets, etc.

In addition to generating an estimate or measurement of the angle, the system also monitors the health of the system. In this example, two metrics are monitored to generate a health status signal. The first metric which is monitored in this example is the gamma value output by the Clarke transform (700). If all of the H1-H3 values are properly scaled and are properly spaced ~120 degrees apart, then the value of gamma will be zero. If gamma becomes (e.g., significantly or meaningfully) non-zero, this indicates an issue with the amplitude and/or phase of one or more of the H1-H3 signals. To check for this, the gamma value is input to a first comparator (704) where it is compared against a maximum gamma deviation (e.g., the largest amount gamma can deviate from zero before being flagged as a problem). If the gamma value is larger than the maximum gamma deviation, it is an indication that at least one of the ICs may have an issue and the output of comparator 704 becomes a 1 (i.e., a 0 means that the gamma value has not exceeded the maximum gamma deviation).

The second metric which is monitored in this example is the amplitude of the alpha-beta vector. The alpha-beta vector is a vector formed by the alpha and beta values output by the Clarke transform. Since alpha and beta are orthogonal to each other, the amplitude of the alpha-beta vector is $\sqrt{\alpha^2+\beta^2}$. If the system is working properly, the amplitude of the alpha-beta vector should be constant. To check for this, the alpha and beta values output by the Clarke transform are input to a function (706) which determines the amplitude of the alpha-beta vector. A nominal amplitude is subtracted (708) from the amplitude output by function 706 and the difference is passed to an absolute value function (710). The absolute value output by function 710 is input to a second comparator (712) where it is compared against a maximum amplitude deviation. If the absolute value exceeds the maximum amplitude deviation, then the output of the second comparator becomes a 1 (so that a 0 means that the amplitude of the alpha-beta vector has not varied beyond a fixed and/or nominal amplitude to an acceptable degree).

The outputs of the first comparator (704) and second comparator (712) are passed to an OR gate (714). If either output of the comparators is a 1 (i.e., the corresponding metric being monitored indicates a problem in the system), then the output of the OR gate (which is the health status signal) will also be a 1. If the health status signal is a 0, then the health of the system is good; if the health status signal is a 1, then the health of the system is bad. In the latter case, the system may decide to stop using the θestimate generating using linear Hall sensors and switch to some other measurement technique (e.g., the one described below which uses discrete Hall sensors).

Compared to other systems, the example system may be desirable because health monitoring is performed. Some other systems may not perform health monitoring.

In the examples above, a trigonometric and/or Clarke transformation-based approach is used. This is merely one solution and in various embodiments some other technique or approach is used. In a first exemplary non-trigonometric approach, simple lookup tables are used (e.g., one for each sensor) along with region constraints which describe or otherwise specify when to use each sensor. For example, given the exemplary 270° spacing above (see, e.g., FIG. 6 and regions 610, 612, and 614), about 270° of range can be covered with this approach. For health monitoring, a reverse lookup can be done on the two sensors not presently in use with simple bound checking on each sensor to determine if there is agreement. If there is disagreement, the health of the system is flagged (e.g., as unhealthy or suspect). The initialization routine runs the health monitoring process on each sensor and determines which region the position is presently in by choosing the solution (i.e., region) which reports as "healthy."

In a second exemplary non-trigonometric approach, a 3D look-up table is used at each point on the calibrated triple-Hall Sensor data. For health monitoring, the construction of the lookup table gives a shallow gradient near the valid solution points and diverge to an invalid value at positions which are not valid (e.g., because one of the sensors disagrees).

In a third exemplary non-trigonometric approach, a Kalman filter or other advanced estimator uses some form of covariance scheduling for each sensor based on the present estimation state. The health of the system is a product of the estimator as well.

How the secondary position measurement factors into the health solution varies depending upon the solution or approach. For the Kalman filter approach, the secondary position measurement is an additional state for the estimator (e.g., bounding its error). For the other two solutions (e.g., simple lookup tables or 3D lookup tables), the secondary position measurement would be used in a manner similar to the trigonometric approach (e.g., as a gross comparison with an additional "voting" sensor to allow continued operation in the event of a failed Hall sensor).

The following figures describe these techniques more formally and/or generally in flowcharts.

Figure 8:
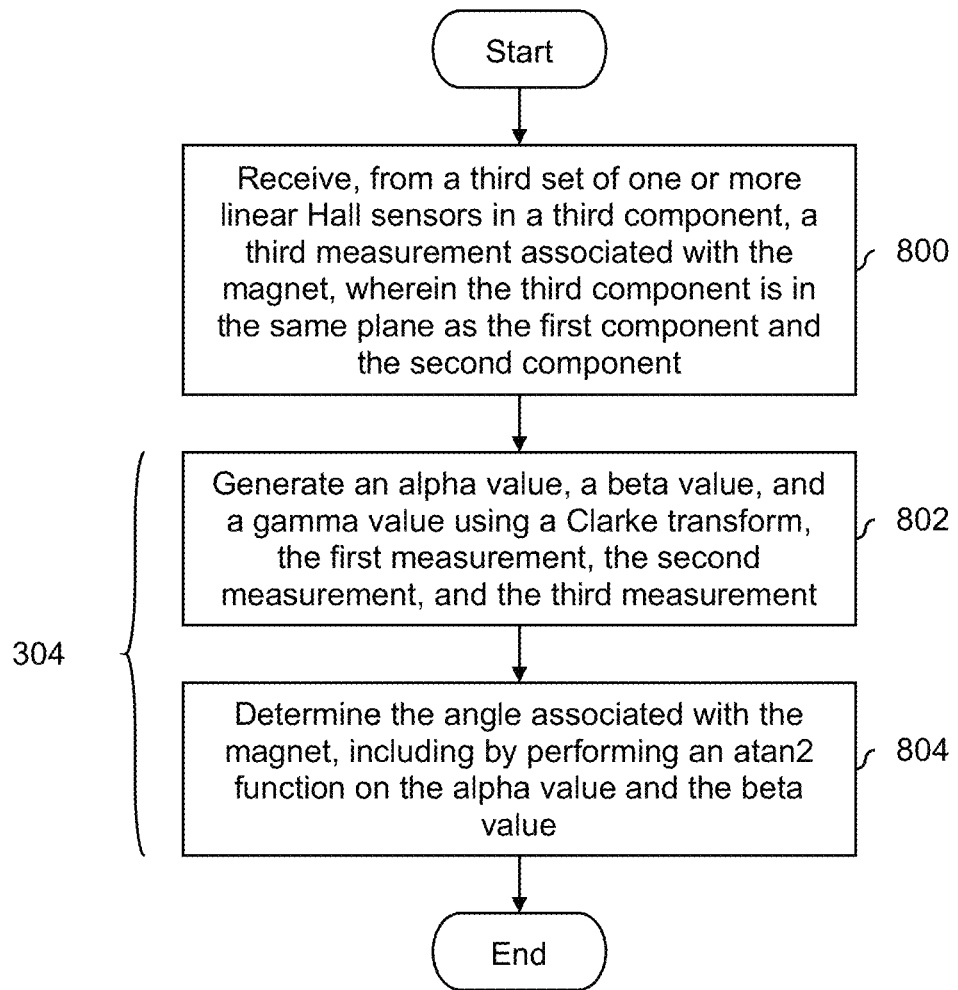
FIG. 8 is a flowchart illustrating an embodiment of a process to estimate an angle using three or more sets of linear Hall sensors.

FIG. 8 is a flowchart illustrating an embodiment of a process to estimate an angle using three or more sets of linear Hall sensors. In some embodiments, the process shown here is performed in combination with the process of FIG. 3. For example, step 800 is an additional step (e.g., in addition to steps 300, 302, and 304) and steps 802 and 804 are part of step 304.

At 800, a third measurement associated with the magnet is received from a third set of one or more linear Hall sensors in a third component, wherein the third component is in the same plane as the first component and the second component. See, for example, FIG. 4 where there are three ICs (402a-402c) with three sets of linear Hall sensors. As described above, in some embodiments, one of the ICs (e.g., the one closest to the magnet) may use a different part number than the other two ICs so that the amplitudes of the signals output by the ICs are substantially the same in spite of the different distances to the magnet.

At 802, an alpha value, a beta value, and a gamma value are generated using a Clarke transform, the first measurement, the second measurement, and the third measurement. See, for example, FIG. 7 where Clarke transform 700 inputs H1-H3 values and outputs alpha, beta, and gamma values. In some embodiments, prior to performing a Clarke transformation, one or more of the H1-H3 signals are scaled (if or as needed) so that the signals have the same magnitude. In some embodiments, different part numbers or component types are used so that the signal output by the IC which is closer to the magnet has the same amplitude as the ICs which are further away.

At 804, the angle associated with the magnet is determined, including by performing an a tan 2 function on the alpha value and the beta value. See, for example, the a tan 2 function (702) in FIG. 7, from which θestimate is obtained.

Figure 9:
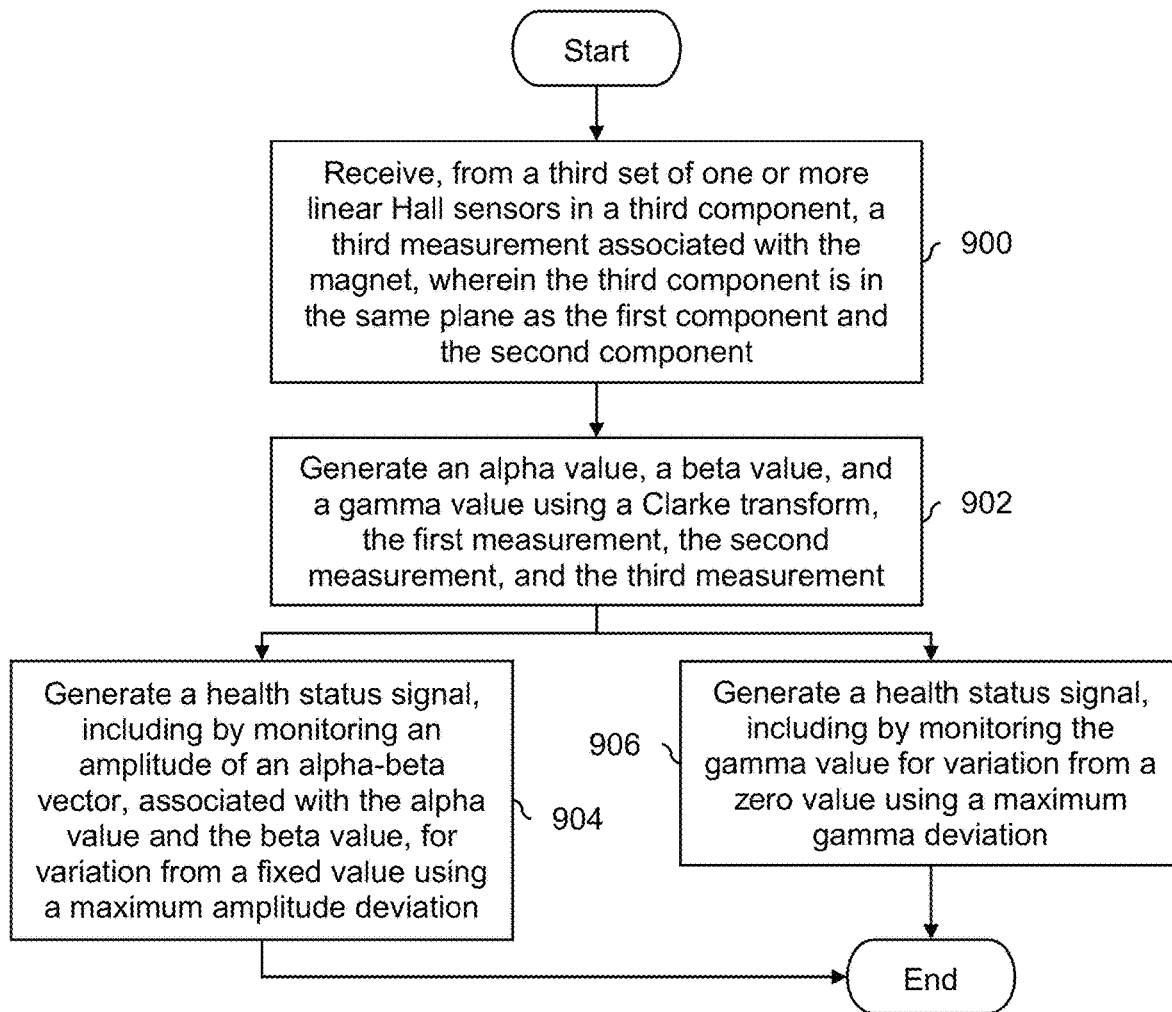
FIG. 9 is a flowchart illustrating an embodiment of a process to generate a health status signal.

FIG. 9 is a flowchart illustrating an embodiment of a process to generate a health status signal. In some embodiments, the example process is performed in combination with the process of FIG. 3.

At 900, a third measurement associated with the magnet is received from a third set of one or more linear Hall sensors in a third component, wherein the third component is in the same plane as the first component and the second component. For example, it may be necessary to have at least three sets of linear Hall sensors in order to detect when the health of the system is poor.

At 902, an alpha value, a beta value, and a gamma value are generated using a Clarke transform, the first measurement, the second measurement, and the third measurement. As described above, in some embodiments, steps are taken to ensure that the first measurement, the second measurement, and the third measurement have the sample amplitude before they are input to the Clarke transform.

At 904, a health status signal is generated, including by monitoring an amplitude of an alpha-beta vector, associated with the alpha value and the beta value, for variation from a fixed value using a maximum amplitude deviation. As described above, the amplitude of the alpha-beta vector should remain constant and variation in the amplitude (e.g., beyond some permitted or acceptable amount) it is indicative of a problem in the system.

At 906, a health status signal is generated, including by monitoring the gamma value for variation from a zero value using a maximum gamma deviation. As described above, the value of gamma should be zero and if gamma deviates from a zero value (e.g., beyond some permitted or acceptable amount), then it is indicative of a problem in the system.

For convenience and brevity, steps 904 and 906 are shown together in this figure but it is not necessary for both to be used in the same system. For example, some embodiments may choose to monitor the amplitude of the alpha-beta vector but not monitor the gamma value, or vice versa. In some embodiments, both are used in the same system (see, e.g., FIG. 7 where the health status signal depends both upon the amplitude of the alpha-beta vector and the gamma value).

Figure 10:
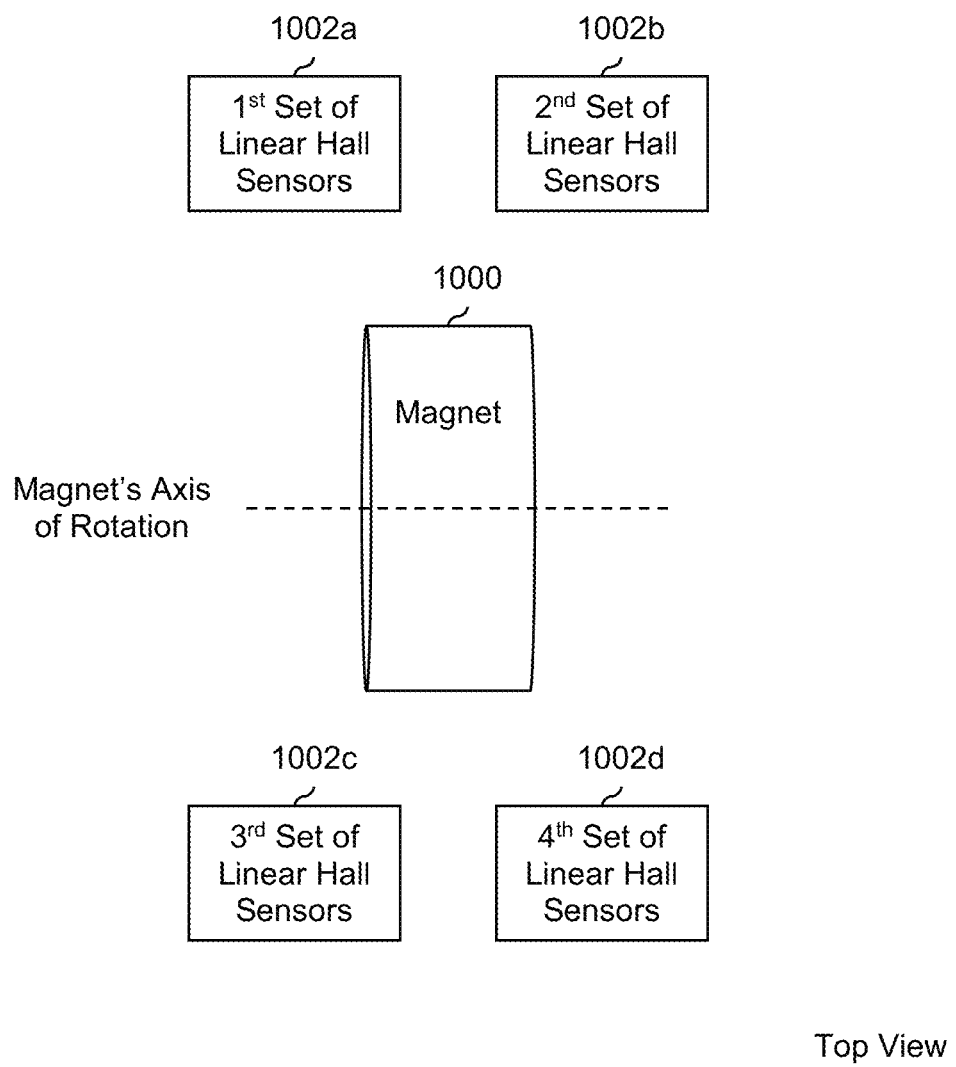
FIG. 10 is a diagram illustrating an embodiment of a servo sensor with four sets of linear Hall sensors.

FIG. 10 is a diagram illustrating an embodiment of a servo sensor with four sets of linear Hall sensors. In the example shown, the four sets of linear Hall sensors (1002a-1002b) are used to measure the angle of the magnet (1000) and monitor the health of the system. In one example, θ13 and θ24 are compared and the angle estimate is based on the discrete Hall sensors. If all of them fall within some tolerance band of each other, then the angle estimate is the average of θ13 and θ24 (e.g., because these are more accurate than the discrete estimate and the average should be better than either by itself). If the three estimates vary from each other by more than some threshold, then median voting is used. That is, whatever value is in the middle is chosen as the angle estimate.

The following figures describe various examples of techniques to measure the angle of an output shaft using discrete Hall sensors. As described above, this technique (which uses discrete Hall sensors) may be used alone or in combination with the linear Hall sensor techniques described above.

Examples with Discrete Hall Sensors

Figure 11:
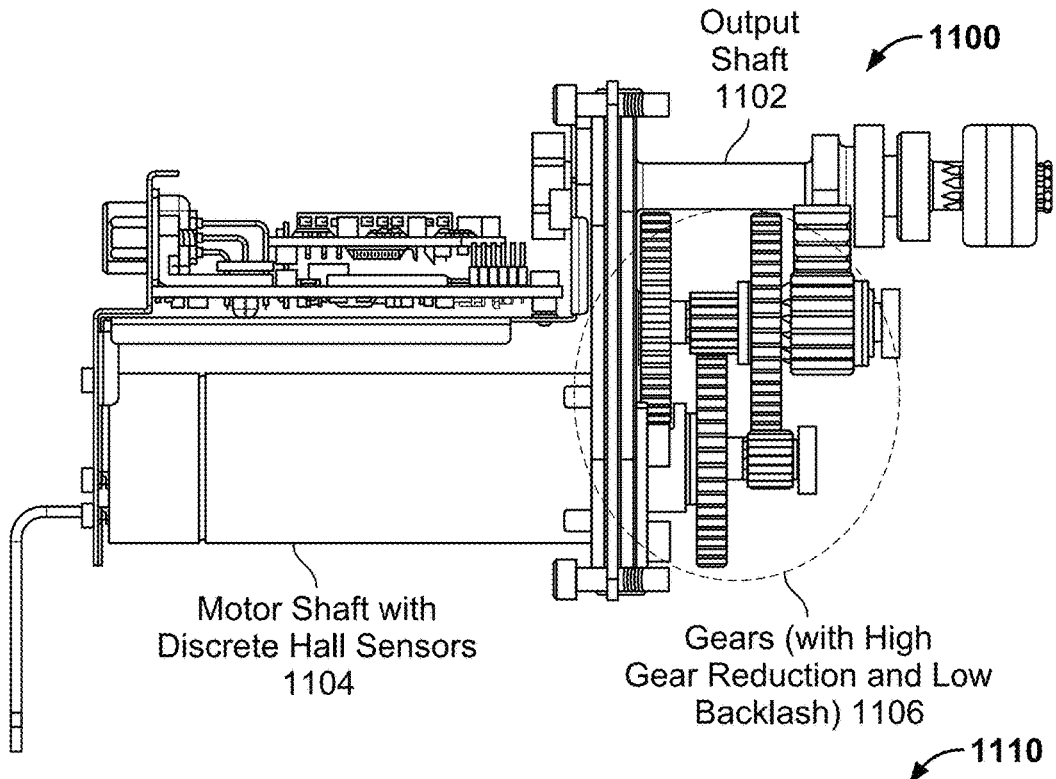
FIG. 11 is a diagram illustrating an embodiment of a motor with discrete Hall sensors which are used to measure the angle of an output shaft.

FIG. 11 is a diagram illustrating an embodiment of a motor with discrete Hall sensors which are used to measure the angle of an output shaft. Diagram 1100 shows a side view of the system. In the example shown, the motor shaft (1104) is associated with a brushless three phase motor. Brushless motors have stationary windings that act against permanent magnets in the rotating part of the motor. The motor has three discrete Hall sensors that are used to measure the angle of the rotor in the motor shaft to within one of six sectors (e.g., where each sector is shaped like a slice of pie and in this example a sector has an angle of 60 degrees). With a brushed motor, discrete Hall sensors would not be used (e.g., because brushes are used instead).

Diagram 1110 shows a table with the outputs of each of the discrete Hall sensors and the corresponding position of the rotor in the motor shaft indicated by that particular combination of discrete Hall sensor output values. Naturally, the number of discrete Hall sensors (in this example, three) and the angle of each sector (in this example, 60 degrees) are merely exemplary and the techniques work other values.

It is noted that one benefit of this technique is that the discrete Hall sensors are included in the system anyway (e.g., they are part of the brushless motor) and so no additional sensors need to be used in order to measure the angle of the output shaft. By reusing an existing component, the size, weight, and cost of the system can be kept down.

As shown in diagram 1100, the output shaft (1102) is coupled to the motor shaft (1104) via a set of gears (1106). In examples described herein, the gears have a gear ratio of 180:1. This means that every (complete) rotation of the motor shaft causes $1/180^{th}$ of a (complete) rotation in the output shaft. So, if the motor shaft started out in sector 1 and the output shaft started out at an angle of 0 degrees, then one rotation of the motor shaft would cause the output shaft angle to increase to (60 degrees)/180=⅓ degree. Another rotation of the motor shaft in the same direction would cause the output shaft angle to go up another ⅓ degree to ⅔ degree and so on. The following figure shows other enumerated examples of positions of a rotor in a motor shaft and corresponding angles of an output shaft.

FIG. 12 is a diagram illustrating an embodiment of related positions of a rotor in a motor shaft and angles of an output shaft. In the example shown, the left column shows the position of the rotor and the right column shows the angle of the output shaft. As described above, the gears have a gear ratio of 180:1 and each rotation of the motor shaft causes the output shaft to increase by (60 degrees)/180=⅓ degree. As shown here, knowledge of the current rotor position alone is not sufficient to determine the current output shaft angle. For example, even if it is known that the current rotor position is sector 2, it is not known whether the current output shaft angle should be ⅓ degree (see row 1202), 2⅓ degrees (see row 1204), 4⅓ degrees (see row 1206), etc.

Instead, this angle measurement technique relies upon incrementing or decrementing a previous output shaft angle based on what direction the rotor moved (that is, this is an incremental technique). Note, for example, that all of the output shaft angles in the right column have a difference of ⅓ degree. If the rotor shifts one sector down (e.g., from sector 2 to sector 1, from sector 3 to sector 2, etc.), then the output shaft angle goes down by ⅓ degree. If the rotor shifts one sector up (e.g., from sector 1 to sector 2, from sector 2 to sector 3, etc.), then the output shaft angle increases by ⅓ degree.

Previous state information, including the previous rotor position and the previous output shaft angle, is kept. The previous rotor position is kept so that the system knows whether the rotor rotated in one direction (e.g., shifted up a sector) versus another direction (e.g., shifted down a sector) and thus whether to increment or decrement the previous output shaft angle by the incremental amount. For example, if the system only knew the current rotor position (e.g., sector 2) but not the previous sector position (e.g., it didn't know whether the rotor was previously in sector 1 or sector 3), then the rotor's direction of movement would not be known and the system would not know whether to increment or decrement the previous output shaft angle by the incremental amount.

The previous output shaft angle is tracked because an incremental technique such as this relies upon the previous value being known. For example, for $x_{i+1}=x_i \pm \Delta$ to work, the value of $x_i$ must be known. Thus, the previous output shaft angle is tracked or kept.

Also, the output shaft angle is initialized to some known value. Once the initial value (e.g., $x_0$) is known, subsequent values (e.g., $x_1$, $x_2$, $x_3$, . . . ) can be determined. In this example, if the output shaft angle is known, the rotor position is also known (see the table shown here) and so in this example it is not necessary for the output shaft angle to (e.g., separately or additionally) be initialized to a known value. Naturally, in embodiments where the rotor position cannot be determined from the output shaft angle (e.g., alone), the rotor position can also be initialized to some known value.

In one example, initialization to a known value is performed by driving or moving a servo to a known position using a mechanical stop. Alternatively, if this angle measurement process is a backup process, the position of the rotor and/or angle of the output shaft may be initialized to known values using the measurement from the primary or initial measurement technique (e.g., using linear Hall sensors as described above). In some applications (e.g., aircraft applications) the latter technique is desirable because it permits the angle of an output shaft to be initialized to a known value without requiring the output shaft to move. For example, aerodynamic control surfaces of an aircraft are controlled by the output shaft of a servo and the output shaft cannot always change to an arbitrary position because this may cause the aircraft to crash during flight.

Returning to FIG. 11, this angle measurement technique yields an acceptable resolution because of two characteristics associated with the gears (1106). First, the gear has a high gear reduction (in this example, 180:1). That is, not only do the gears reduce the number of rotations translated from the motor shaft (1104) to the output shaft (1102), but that ratio is relatively high. Second, the gears have low backlash (in this example, ¼ degree). Both the gear ratio and the backlash affect the resolution of this angle estimation technique. In this example, the resolution of the output shaft angle estimated or measured using this technique is:

$$\text{resolution} = \frac{\text{angle of sector}}{\text{gear reduction}} + \text{backlash} = \frac{60°}{180} + 1/4° \approx 0.58°$$

This is an acceptable resolution for the angle being estimated (at least for applications of interest) but other systems with lower gear ratios and/or with more backlash may not be able to produce angle measurements of the output shaft with acceptable resolution.

The following figure describes these processes more formally and/or generally in a flowchart.

Figure 13:
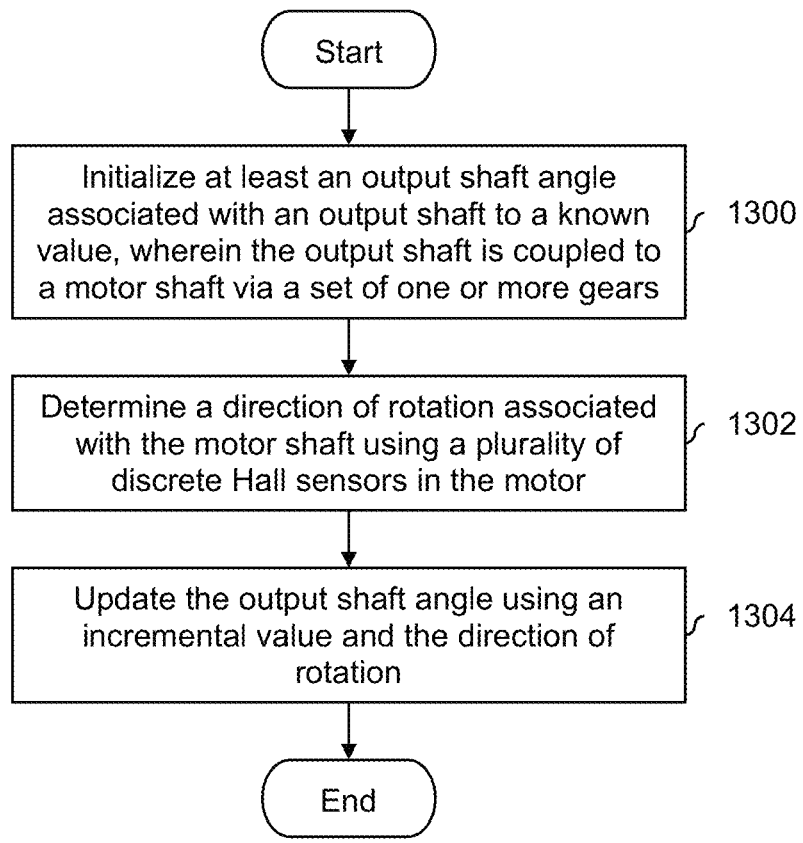
FIG. 13 is a flowchart illustrating an embodiment of a process to estimate an angle using a plurality of discrete Hall sensors.

FIG. 13 is a flowchart illustrating an embodiment of a process to estimate an angle using a plurality of discrete Hall sensors. In some embodiments, this technique is used as a backup angle measurement technique (e.g., if the linear Hall sensor based technique described above fails). It is noted that having the backup angle measurement technique rely upon a different set of sensors compared to the primary angle measurement technique is attractive for reliability reasons (e.g., the discrete Hall sensors may still be working even if the linear Hall sensors are not working). Alternatively, this technique may be used as a primary angle measurement technique (e.g., not in combination with the linear Hall sensor based technique described above).

At 1300, at least an output shaft angle associated with an output shaft is initialized to a known value, wherein the output shaft is coupled to a motor shaft via a set of one or more gears. In FIG. 12, for example, the output shaft angle is initialized to a value of 0 degrees (corresponding to row 1200). In some embodiments, some other angle measurement technique provides its estimate or measurement of the output shaft angle as the known value during initialization. As described above, if needed, the rotor position is also initialized to a known value.

At 1302, a direction of rotation associated with the motor shaft is determined using a plurality of discrete Hall sensors in the motor. For generality, the directions of rotation of may be either a first direction (e.g., a rotor in the motor shaft goes up a sector or rotates clockwise) or a second direction (e.g., the rotor in the motor shaft goes down a sector or rotates counterclockwise).

At 1304, the output shaft angle is updated using an incremental value and the direction of rotation. In FIG. 12, for example, the incremental value is ⅓ degree. If the rotor in that example moves up as sector, the output shaft angle is updated by adding ⅓ degree; if the rotor goes down a sector, the output shaft angle is updated by subtracting ⅓ degree.

Figure 14:
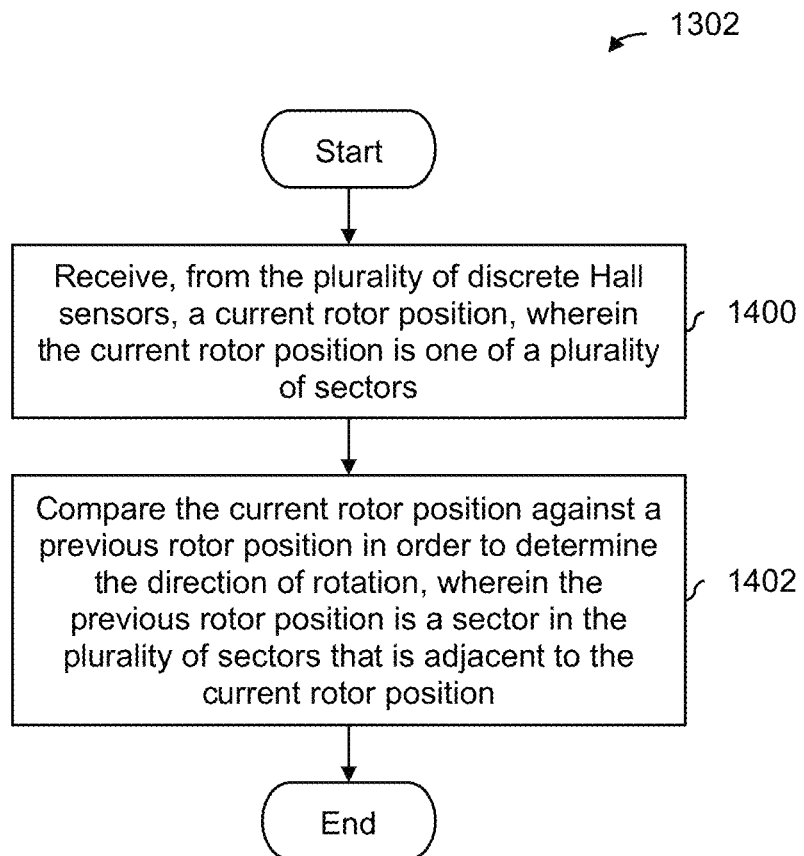
FIG. 14 is a flowchart illustrating an embodiment of a process to determine a direction of rotation associated with the motor shaft.

FIG. 14 is a flowchart illustrating an embodiment of a process to determine a direction of rotation associated with the motor shaft. In some embodiments, step 1302 in FIG. 13 includes the process shown.

At 1400, a current rotor position is received from the plurality of discrete Hall sensors, wherein the current rotor position is one of a plurality of sectors. See, for example, table 1110 in FIG. 11 which shows what combination of discrete Hall sensor outputs correspond to what sector.

At 1402, the current rotor position is compared against a previous rotor position in order to determine the direction of rotation, wherein the previous rotor position is a sector in the plurality of sectors that is adjacent to the current rotor position. As described above, the rotor cannot skip over sectors and so the previous rotor position (i.e., the previous sector) and the current rotor position (i.e., the current sector) are adjacent to each other. The two directions of rotation may generally be referred to as a first and second direction.

Figure 15:
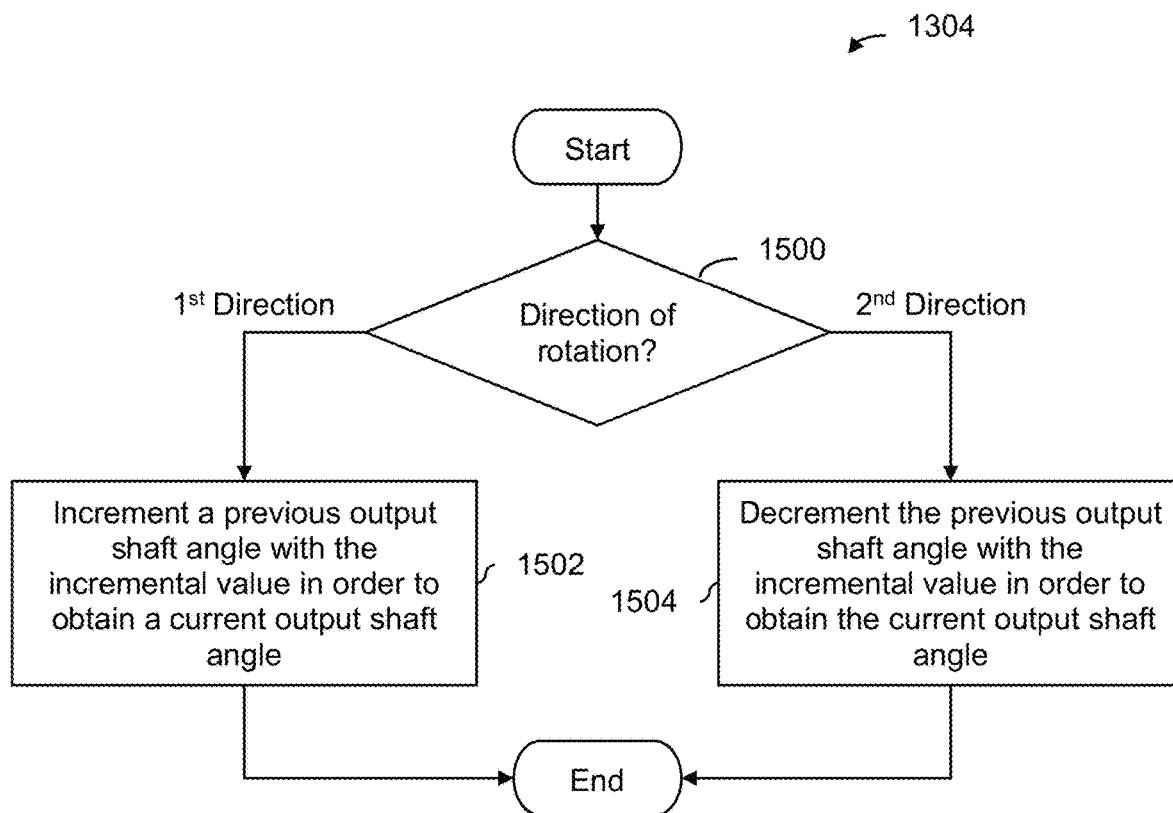
FIG. 15 is a flowchart illustrating an embodiment of a process to update an output shaft angle using an incremental value and a direction of rotation associated with a motor shaft.

FIG. 15 is a flowchart illustrating an embodiment of a process to update an output shaft angle using an incremental value and a direction of rotation associated with a motor shaft. In some embodiments, step 1304 in FIG. 13 includes the process shown.

At 1500, the direction of rotation is evaluated. In the event the direction of rotation associated with the motor shaft is a first direction, a previous output shaft angle is increment with the incremental value in order to obtain a current output shaft angle at 1502. In FIG. 12, for example, the incremental value is ⅓ degree and moving up a sector causes the incremental value to be added to the previous output shaft angle.

Otherwise, if the direction of rotation associated with the motor shaft is a second direction, the previous output shaft angle is decremented with the incremental value in order to obtain the current output shaft angle at 1504. In FIG. 12, for example, the (previous) output shaft angle is decremented when the rotor goes down a sector.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A fault-tolerant system including a brushless motor, the system comprising:
   an output shaft;
   a first servo sensor configuration having a first plurality of separate sensor components each having a first set of one or more Hall sensors of a first type, the first servo sensor configuration configured to output a primary estimate of an angle of the output shaft;
   a second servo sensor configuration having a second plurality of separate sensor components each having a second set of one or more Hall sensors of a second type, the second servo sensor configuration configured to output a secondary estimate of an angle of the output shaft; and
   a processor configured to:
      monitor a health of the first servo sensor configuration by checking predetermined metrics associated with the primary estimate of the angle of the output shaft;
      generate a health status signal that indicates whether the health of the first servo sensor configuration is good or bad;
      in the event the health status signal indicates bad health for the first servo sensor configuration, discontinue use of the primary estimate of the angle estimated by the first servo sensor configuration in favor of the second servo sensor configuration.

2. The fault-tolerant system recited in claim 1, wherein the first set of one or more Hall sensors comprise linear Hall sensors and the second set of one or more Hall sensors comprise discrete Hall sensors.

3. The fault-tolerant system recited in claim 2 wherein the first servo sensor configuration comprises three separate sensor components each comprising one or more linear Hall sensors.

4. The fault-tolerant system recited in claim 3 further comprising a magnet coupled to the output shaft, and wherein the three separate sensor components are disposed in a plane parallel to an axis of rotation of the magnet.

5. The fault-tolerant system recited in claim 3 wherein the three separate sensor components are mounted on a printed circuit board, the printed circuit board being disposed parallel to the output shaft.

6. The fault-tolerant system recited in claim 3 wherein each of the three separate sensor components generates a value associated with the angle of the output shaft, and wherein the values generated by the three separate sensor components have a phase difference of approximately 120 degrees.

7. The fault-tolerant system recited in claim 3 wherein each of the three separate sensor components generates a value associated with the angle of the output shaft providing three values H1, H2 and H3 corresponding to the three separate sensor components, respectively, and wherein a Clarke transform inputs the three values H1, H2 and H3, and generates three Clarke transform output values, alpha value, beta value and gamma value.

8. The fault-tolerant system recited in claim 7 wherein the predetermined metrics checked for monitoring the health of the first servo sensor configuration comprise the gamma value generated by the Clarke transform.

9. The fault-tolerant system recited in claim 8 wherein the processor comprises a first comparator coupled to compare the gamma value against a predetermined maximum gamma deviation, and to generate a first comparator output.

10. The fault-tolerant system recited in claim 9 wherein the predetermined metrics checked for monitoring the health of the first servo sensor configuration further comprise an amplitude signal generated as a function of the alpha and beta values generated by the Clarke transform.

11. The fault-tolerant system recited in claim 10 wherein the processor further comprises a second comparator coupled to compare the amplitude signal against a predetermined maximum amplitude deviation, and to generate a second comparator output.

12. The fault-tolerant system recited in claim 11 wherein the processor further comprises logic circuitry that generates the health status signal in response to one or both of the first comparator output and the second comparator output.

13. The fault-tolerant system recited in claim 3 further comprising three lookup tables each associated with one of the three separate sensor components, respectively, along with region constraints specifying when to use each sensor component.

14. The fault-tolerant system recited in claim 13 wherein the processor is configured to perform a reverse lookup table on two sensor components not in use in order to determine the health of the first servo sensor configuration.

15. The fault-tolerant system recited in claim 3 comprising a Kalman filter that uses covariance scheduling for each sensor component based on current estimation state.

16. A method of operating a fault-tolerant servo system, comprising:
   measuring an angle of an output shaft using a first servo sensor configuration that includes a first plurality of separate sensor components each having a first set of one or more Hall sensors of a first type;
   monitoring a health of the first servo sensor configuration by checking predetermined metrics associated with the measured angle;
   generating a health status signal that indicates whether the health of the first servo sensor configuration is good or bad;
   in the event the health status signal indicates bad health for the first servo sensor configuration, discontinuing use of the first servo sensor configuration in favor of a second servo sensor configuration, wherein the second servo sensor configuration includes a second plurality of separate sensor components each having a second set of one or more Hall sensors of a second type.

17. The method recited in claim 16, wherein the first set of one or more Hall sensors comprises linear Hall sensors and the second set of one or more Hall sensors comprises discrete Hall sensors.

18. The method recited in claim 16 wherein the first servo sensor configuration comprises three separate sensor components generating three measured values H1, H2 and H3 corresponding to the three separate sensor components, respectively, and wherein a Clarke transform inputs the three values H1, H2 and H3, and generates three Clarke transform output values, alpha value, beta value and gamma value, respectively.

19. The method recited in claim 18, wherein checking predetermined metrics comprises monitoring &the gamma value output by the Clarke transform of the measured angle.

20. The method recited in claim 19, wherein monitoring the gamma value comprises comparing the gamma value against a maximum allowable gamma deviation.

21. The method recited in claim 20, wherein checking predetermined metrics further comprises monitoring an amplitude of an alpha-beta vector of the Clarke transform of the measured angle.

22. The method recited in claim 21, wherein monitoring an amplitude of the alpha-beta vector of the Clarke transform further comprises:
- determining an amplitude of the alpha-beta vector;
- subtracting a nominal amplitude from the determined amplitude to generate a difference value;
- determining an absolute value of the difference value; and
- comparing an absolute value against a maximum amplitude deviation.

\* \* \* \* \*